US009621042B2

(12) United States Patent
Morizot et al.

(10) Patent No.: US 9,621,042 B2
(45) Date of Patent: Apr. 11, 2017

(54) SWITCH MODE POWER SUPPLY MODULE HAVING A HICCUP MODE AND ITEM OF EQUIPMENT POWERED BY SAID MODULE

(71) Applicant: THOMSON LICENSING, Issy de Moulineaux (FR)

(72) Inventors: Gerard Morizot, Voiron (FR); Philippe Marchand, Vitre (FR); Philippe Guillot, Bruz (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/652,815

(22) PCT Filed: Dec. 16, 2013

(86) PCT No.: PCT/EP2013/076654
§ 371 (c)(1),
(2) Date: Jun. 17, 2015

(87) PCT Pub. No.: WO2014/095687
PCT Pub. Date: Jun. 26, 2014

(65) Prior Publication Data
US 2015/0333626 A1    Nov. 19, 2015

(30) Foreign Application Priority Data
Dec. 17, 2012    (FR) ...................... 12 62130

(51) Int. Cl.
H02M 3/156    (2006.01)
H02M 3/158    (2006.01)
(Continued)

(52) U.S. Cl.
CPC ........... H02M 3/158 (2013.01); H02M 3/156 (2013.01); H02M 3/33507 (2013.01);
(Continued)

(58) Field of Classification Search
CPC .. H02M 3/156; H02M 3/158; H02M 3/33507; H02M 2001/007; H02M 2001/0035
See application file for complete search history.

(56) References Cited

U.S. PATENT DOCUMENTS 6,288,914 B1    9/2001    Sato
7,030,596 B1    4/2006    Salerno et al.
(Continued)

FOREIGN PATENT DOCUMENTS

DE    102005038660    2/2007
FR    1251274          1/1961
WO   WO2006120640     11/2006

OTHER PUBLICATIONS

Search Report Dated Apr. 2, 2014.
(Continued)

Primary Examiner — Matthew Nguyen
(74) Attorney, Agent, or Firm — Jack Schwartz & Associates, PLLC

(57) ABSTRACT

The invention relates to switch mode power supply modules and items of equipment powered by these modules. The power supply module comprises circuits for cyclically interrupting the switching operation, during a so-called switching operation interruption phase, if the load current of the module is less than a current threshold value and sustaining the switching operation, during a so-called switching operation phase, if the load current is greater than the load current threshold value and circuits for ending the switching operation interruption phase if the power supply voltage of the item of equipment is greater than a voltage threshold value. The item of equipment powered by the module comprises a capacitive element able to store energy from the module during the switching operation phase and to release the
(Continued)

energy stored between the output terminals of the power supply module when it receives an activation signal.

20 Claims, 2 Drawing Sheets

(51) Int. Cl.
    *H02M 3/335* (2006.01)
    *H04N 5/63* (2006.01)
    *H02M 1/00* (2006.01)

(52) U.S. Cl.
    CPC ........ *H04N 5/63* (2013.01); *H02M 2001/007* (2013.01); *H02M 2001/0035* (2013.01); *Y02B 70/16* (2013.01)

(56) References Cited

U.S. PATENT DOCUMENTS

| | | | |
|---|---|---|---|
| 7,772,721 B2* | 8/2010 | Michalak | H02J 9/005 307/109 |
| 8,041,964 B2 | 10/2011 | Price et al. | |
| 8,143,748 B2 | 3/2012 | Ochi | |
| 8,513,936 B2* | 8/2013 | Hane | H02M 3/1563 323/288 |
| 2002/0008979 A1 | 1/2002 | Nagai et al. | |
| 2007/0041225 A1 | 2/2007 | Fahlenkamp | |
| 2012/0062042 A1 | 3/2012 | Burke | |
| 2012/0074792 A1 | 3/2012 | Hodges et al. | |
| 2013/0208511 A1 | 8/2013 | Marchand et al. | |
| 2014/0111011 A1* | 4/2014 | Tiruvuru | H02M 1/36 307/39 |
| 2015/0102672 A1* | 4/2015 | Matsumoto | H02M 1/08 307/31 |
| 2016/0149490 A1* | 5/2016 | Nakamura | H02M 3/158 323/271 |
| 2016/0197562 A1* | 7/2016 | Kondo | H02M 7/2176 363/126 |
| 2017/0033706 A1* | 2/2017 | Usami | H02M 7/04 |

OTHER PUBLICATIONS

Abbriviated Data Sheet; Author Unknown "78K0S Family Product Letter UPD789881 UPD78F9882 8-bit Microcontrollers", NEC, Sep. 2001.

Abbriviated Data Sheet; Author Unknown "K0S Family UPD789881 Ultra-Low 8-Bit Microcontroller with LCD Controller", NEC, Sep. 2001.

Abbriviated Data Sheet; Author Unknown "Texas Instruments TPS54426 4.5V to 18V Input, 4-A Synchronous Step-Down SWIFT Converter with Eco-Mode", SLVSAD6C, Aug. 2010-Revised Jul. 2011.

Abbriviated Data Sheet; Author Unknown "Texas Instruments TPS54427 4.5-V to 18-V Input, 4-A Output Single Synchronous Step-Down Switcher With Integrated FET", SLVSB43C, Nov. 2011-Revised Feb. 2016.

Abbriviated Data Sheet; Author Unknown "ST life.augmented LK112 Low Noise and Low Drop Voltage Regulator with Shutdown Function", DocID7362 Rev 17, pp. 1-18, Apr. 2014.

* cited by examiner

SWITCH MODE POWER SUPPLY MODULE HAVING A HICCUP MODE AND ITEM OF EQUIPMENT POWERED BY SAID MODULE

This application claims the benefit, under 35 U.S.C. §365 of International Application PCT/EP2013/076654, filed 16 Dec. 2013, which was published in accordance with PCT Article 21(2) on 26 Jun. 2014 in English and which claims the benefit of French patent application No. 1262130 filed on 17 Dec. 2012.

TECHNICAL FIELD

The present invention relates to the field of items of equipment powered by external switch mode power supply modules able to operate according to a hiccup mode wherein, in the absence of load, the switching operation of the power supply module is interrupted then reactivated cyclically to limit the residual consumption of the item of equipment.

PRIOR ART

When an item of equipment is powered by an external power supply module (commonly called a DC pack or DC power block), the operating mode corresponding to the lowest consumption is implemented when the connection with the item of equipment (which represents the load of the power supply module) is broken (load disconnected or switch in open position). However, even if this connection is broken, there still remains a residual consumption of the power supply module when it is connected to the mains.

However, the commercialisation of electronic equipment today requires compliance with power consumption directives. Notably in Europe the EC/278/2009 directive requires a level of power consumption less than 0.3 W for power supplies delivering a nominal power less than 51 W.

Theoretically, power supplies using PFM (Pulse Frequency Modulation) mode should be able to attain a consumption less than 100 mW by using application specific integrated circuits. But traditionally, the no-load residual consumption is in the order of 150 mW.

There is a need to reduce this average residual consumption further, notably to satisfy the constraints of the set of directives at international level, such as the COC (Code of Conduct) or EUP (Energy Using Product).

With this in mind, a French patent application registered under patent file number 12 51274 was filed in order to reduce residual consumption in the case of a switch mode power supply.

In this patent application, a device for controlling the switching operation in a switch mode power supply module is described, the switch mode power supply module being intended to supply power to an item of equipment via a conductor. This device is for example integrated into a switch mode power supply device intended to charge the battery of the item of equipment, typically in a telephone battery charger.

This device comprises:
- a circuit for measuring the load current flowing in said item of equipment,
- a circuit for comparing said measured load current with a predefined load current threshold value, and,
- a circuit for controlling the switching operation cyclically interrupting the switching operation, during a so-called switching operation interruption phase of predetermined duration, if said measured load current is less than or equal to said predefined load current threshold value and sustaining the switching operation, during a so-called switching operation phase of predetermined duration, if said measured load current is greater than said threshold value.

This device for controlling the switching operation operates autonomously by detecting the absence of connection to an item of equipment. The absence of connection to an item of equipment is reflected in the absence of a load current (or a substantially zero load current). In the case of the telephone battery charger, the absence of load current arises when the telephone is no longer connected to the charger or when the telephone battery is charged.

When this absence of load current is detected, the switch mode power supply module enters into an operating mode, known as hiccup mode, wherein the switching operation of the power supply is interrupted then reactivated cyclically so as to limit the residual consumption of the switch mode power supply.

During the hiccup mode, the power supply module ceases the switching operation for a predetermined period which may last several tens of seconds then restarts for a second period during which it can again carry out a measurement of the load current, then again ceases the switching operation if the measured load current is less than the predefined threshold value and so on. The power supply module remains in hiccup mode until the measured load current again exceeds the predefined threshold value.

This hiccup operating mode with measurement of the load current is more specifically suitable for switch mode power supplies intended to charge the battery of an item of equipment.

However, it is not suitable for switch mode power supplies used to supply power directly to the item of equipment, for example for the switch mode power supply of a decoder (set top box). In fact, in this case, the absence or the low value of the load current arises when the set top box is off or has entered standby mode. If the switch mode power supply module of this item of equipment enters a hiccup mode due to for example the item of equipment entering standby mode, the item of equipment must await the end of the switching operation interruption phase to be able to be supplied with a current sufficient to resume normal operation (exit from standby mode). This means for example that, if the user of the item of equipment initiates an action on the item of equipment (for example, by pressing a key on the remote control), the item of equipment must await the end of the switching operation interruption phase to be able to carry out the action or the operation requested by the user. This also means that the item of equipment must temporarily save the request of the operator in order to initiate the action during the switching operation phase to follow. The responsiveness of the item of equipment is therefore substantially reduced. If the switching operation interruption phase lasts around twenty or thirty seconds, this means that the response time of the item of equipment may be as high as these values, which is unacceptable.

SUMMARY OF THE INVENTION

One purpose of the invention is to overcome the disadvantages described above and to propose a switch mode power supply module and an associated item of equipment which make it possible to obtain a low response time while retaining a low residual consumption.

The object of the invention is a switch mode power supply module intended to supply power to an item of equipment between two power supply rails, said switch mode power supply module comprising a switching operation control device, said switching operation control device comprising:

- a circuit for measuring the load current,
- a circuit for comparing said measured load current with a predefined load current threshold value, and,
- a switching operation control circuit cyclically interrupting the switching operation, during a so-called switching operation interruption phase of predetermined duration, if said measured load current is less than or equal to the load current threshold value and sustaining the switching operation, during a so-called switching operation phase of predetermined duration, if said measured load current is greater than the load current threshold value,
- a circuit for measuring the power supply voltage present between the two power supply rails,
- a circuit for comparing the measured power supply voltage with a predefined power supply voltage threshold value, said switching operation control circuit ending the switching operation interruption phase if the measured power supply voltage is greater than or equal to the power supply voltage threshold value.

Thus, according to the invention, the switch mode power supply module enters hiccup mode when the load current is less than or equal to the load current threshold value and this hiccup mode is interrupted when the voltage between the two power supply rails at the output of the module is greater than the power supply voltage threshold value. This increase in the voltage between the two power supply rails is caused by the item of equipment such as described below when it requires to be supplied with power.

The invention also relates to the method for controlling the switching operation of such a module. The invention thus relates to a switch mode power supply module control method, said switch mode power supply module being intended to supply power to an item of equipment between two power supply rails, said method comprising the following steps:

- measuring, in said switch mode power supply module, the load current,
- comparing said measured load current with a predefined load current threshold value,
- if said measured load current is less than or equal to said predefined load current threshold value, cyclically interrupting the switching operation until the measured load current value is greater than said predefined load current threshold value,
- measuring the voltage between the two power supply rails,
- comparing the measured voltage with a predefined power supply voltage threshold value,
- if the measured voltage is greater than or equal to said power supply voltage threshold value, stopping the switching operation interruption.

The object of the invention is also an item of equipment which is supplied with power by this switch mode power supply module. The invention therefore also relates to an item of equipment intended to be supplied with power by a switch mode power supply module such as previously described, characterised in that it comprises a capacitive element connected between the two power supply rails able to store energy from the switch mode power supply module during the switching operation phase of the switch mode power supply module and to supply the stored energy to a circuit for activating the item of equipment during the switching operation interruption phase of the switch mode power supply module so that, when the item of equipment receives an activation signal, said activation circuit applies between the two power supply rails the voltage present at the terminals of the capacitive element.

According to a particular embodiment, the item of equipment comprises a voltage converter able to convert the voltage at the terminals of said capacitive element into a lower constant voltage supplying power to the activation circuit.

The invention also relates to the method for controlling such an item of equipment. This method comprises the following steps:

- storing energy from the switch mode power supply module during the switching operation phase of the switch mode power supply module in a capacitive element connected between the two power supply rails,
- applying between the two power supply rails the voltage present at the terminals of the capacitive element when the item of equipment receives an activation signal.

BRIEF DESCRIPTION OF THE FIGURES

Other advantages may also occur to those skilled in the art upon reading the examples below, illustrated by the annexed figures, given by way of illustration.

DETAILED DESCRIPTION OF THE INVENTION

Figure 1:
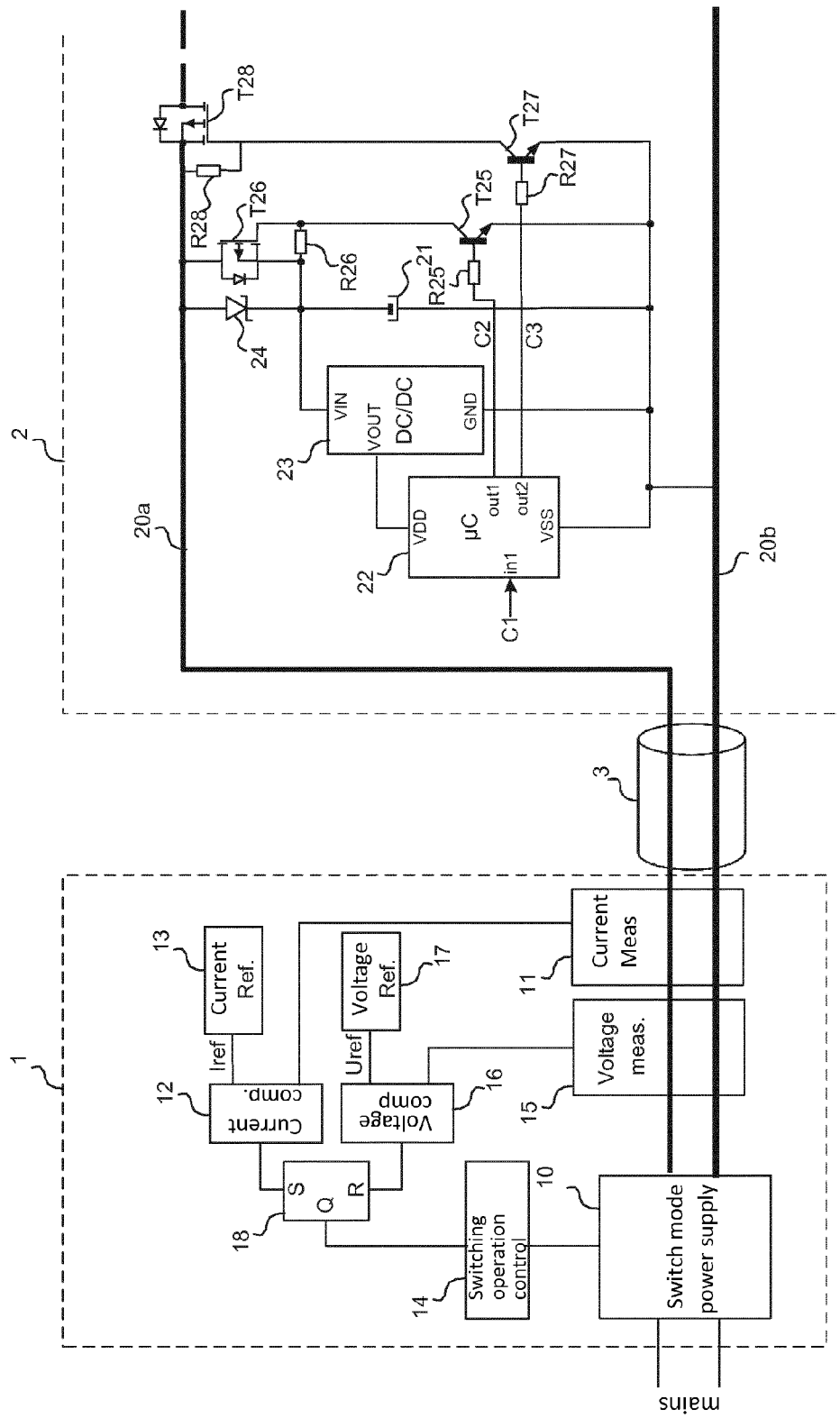
FIG. 1 shows the diagram of a switch mode power supply module and an item of equipment in accordance with the invention.

FIG. 1 shows an item of electrical or electronic equipment 2 powered by a switch mode power supply module 1, the two devices being in accordance with the invention.

The switch mode power supply module 1 is connected on one hand to the electrical network, also called "mains", and on the other hand to the item of equipment 2 via a power cord 3 with two conducting wires. The switch mode power supply module transforms the AC voltage supplied by the mains into a voltage useful for the proper operation of the item of equipment.

According to the invention, the switch mode power supply module 1 comprises, in addition to the standard switching operation means 10, additional switching operation control means for implementing and managing a hiccup mode. During this hiccup mode, the power supply module detects the absence of load and interrupts then reactivates the switching operation of the power supply cyclically to limit the residual consumption of the module. This hiccup mode is interrupted when the item of equipment requires voltage.

According to the invention, the switching operation control means comprises a load current measurement circuit 11, a circuit for comparing 12 said measured load current with a predefined load current threshold value Iref supplied by a current reference circuit 13, and a switching operation control circuit 14 cyclically interrupting the switching operation, during a so-called switching operation interruption phase of predetermined duration, if said measured load current is less than or equal to Iref and sustaining the switching operation, during a so-called switching operation phase of predetermined duration, if the measured load current is greater than Iref.

The load current measurement is carried out during the switching operation phase of the module. In the case of a cycle having a duration of 30 seconds, the duration of the switching operation phase is for example 0.5 seconds and that of the switching operation interruption phase is 29.5 seconds. The load current measurement being carried out by the switch mode power supply module, this latter operates autonomously. The item of equipment does not require to transmit control messages or signals to the item of equipment to move from a so-called normal operating mode, wherein the switching operation is never interrupted, to hiccup mode or vice versa.

The power supply module also comprises a voltage measurement circuit 15 for measuring the power supply voltage present between the two conductors of the power supply cable 3. These two conductors are connected to two power supply rails 20a and 20b of the item of equipment 2. It also comprises a circuit for comparing 16 the measured power supply voltage with a predefined power supply voltage threshold value Uref supplied by a voltage reference circuit 17. When the switching operation control circuit 14 detects that measured power supply voltage is greater than or equal to Uref, it stops the switching operation interruption phase.

In the proposed embodiment, the output of the current comparator 12 and the output of the voltage comparator 16 are connected to the switching operation control circuit 14 via an RS flip-flop 18. The output of the current comparator 12 is connected to input S (for Set) of the flip-flop, the output of the voltage comparator 16 is connected to input R (for Reset) of the flip-flop and output Q of the flip-flop is connected to the input of the switching operation control circuit 14. Thus, if the measured load current exceeds Iref, the flip-flop activates the control circuit 14 in order to implement the hiccup mode and, if the measured voltage exceeds Uref, the flip-flop deactivates the control circuit 14 in order to end the hiccup mode.

As indicated above, hiccup mode is interrupted when the voltage between the power supply rails 20a and 20b of the item of equipment exceeds a power supply voltage threshold value. The item of equipment 2 is therefore modified in order to increase the voltage between the two power supply rails when it requires the switch mode power supply module to exit hiccup mode.

For this purpose, the item of equipment 2 comprises a capacitive element 21 connected between the two power supply rails for storing energy from the switch mode power supply module during the switching operation phase of the switch mode power supply module and to supply the stored energy to an activation circuit 22 during the switching operation interruption phase of the switch mode power supply module. The activation circuit 22 is supplied with power by the capacitive element 21 via a DC converter 23. This voltage converter is intended to convert the voltage at the terminals of the capacitive element, for example of the order of 12 volts, into a lower constant voltage, for example of the order of 3.3 volts. The activation circuit 22 is a low-consumption microcontroller, for example the microcontroller µPD789881 manufactured by the company NEC which only consumes 18 microamperes. It is supplied with power between its two terminals VDD and VSS by the voltage delivered by the converter 23. The voltage converter can be a DC/DC converter of "buck" or "step-down" type from the TPS54x26/27 series manufactured by the company Texas Instruments which has a PFM mode (Pulse Frequency Mode) for ensuring minimal low-load losses or a linear regulator for example from the LK112xx series manufactured by the company STMicroelectronics or a combination of the two types to optimise performance both in standby mode and in normal mode.

Finally, the capacitive element 21 is a reservoir capacitor having a high value, for example twice the value of the capacitors mounted directly between the power supply rails, capacitors of the switch mode power supply included, that is for example 4700 µF if the switch mode power supply has 2000 µF. It is connected to power supply rail 20a via a non-return diode 24.

The activation circuit 22 comprises an activation input int at which it receives an activation signal C1 and two outputs out1 and out2 at which it delivers two control signals, respectively C2 and C3.

The activation signal C1 is in an ON state when the item of equipment must be started or woken up. This signal can come from a remote control, a timer or the like.

As soon as the activation circuit 22 receives an ON state activation signal, it delivers an ON state control signal C2 which will control the rapid discharge of the capacitive element 21 into the power supply rails 20a and 20b. This discharge will increase the voltage between the power supply rails and initiate the cessation of hiccup mode.

In the example of FIG. 1, the discharge of the capacitive element 21 is controlled via the intermediary of a transistor-based switch, itself controlled by control signal C2. In FIG. 1, the switch is formed of two transistors T25, T26 and two resistors R25, R26. Transistor T25 is a bipolar transistor and transistor T26 is a field effect transistor of MOS (or MOSFET) type. The base of transistor T25 is connected to output out1 via current limiting resistor R25, its emitter is connected to power supply rail 20b and its collector is connected to the gate of transistor T26. The gate and the source of transistor T26 are connected to each other by resistor R26. Finally, the drain of transistor T26 is connected to power supply rail 20a and its source is connected to the cathode of the capacitor 21.

Thus, when the item of equipment receives an ON state activation signal C1, said activation circuit 22 controls the connection of the capacitive element 21 between the rails 20a and 20b. The voltage between the two rails then increases suddenly. This increase in voltage is detected by the voltage comparator 16 which ends hiccup mode.

In order to avoid the energy stored by the capacitive element 21 being absorbed by the load of the item of equipment during the sudden discharge of the capacitive element, the item of equipment is advantageously supplemented by a second switch. In FIG. 1, this second switch is formed of two transistors T27, T28 and two resistors R27, R28. Transistor T27 is a bipolar transistor and transistor T28 is a field effect transistor of MOS (or MOSFET) type. The base of transistor T27 is connected to output out2 via current limiting resistor R27, its emitter is connected to power supply rail 20b and its collector is connected to the gate of transistor T28. Transistor T28 is arranged on power supply rail 20a, the source of transistor T28 being connected to an upstream part of rail 20a and the drain of transistor T28 being connected to a downstream part of rail 20a. The upstream part of rail 20a supplies power to the capacitive element 21 and the converter 23. The downstream part of rail 20a supplies power to the remainder of the item of equipment. The gate and the source of transistor T28 are moreover connected to each other by resistor R28.

According to the invention, the activation circuit 22 delivers an ON state control signal C3 after delivering ON state control signal C2. Thus, when control signal C2 is in ON state, the capacitive element does not discharge into the upstream part of the item of equipment.

Figures 2, 3:
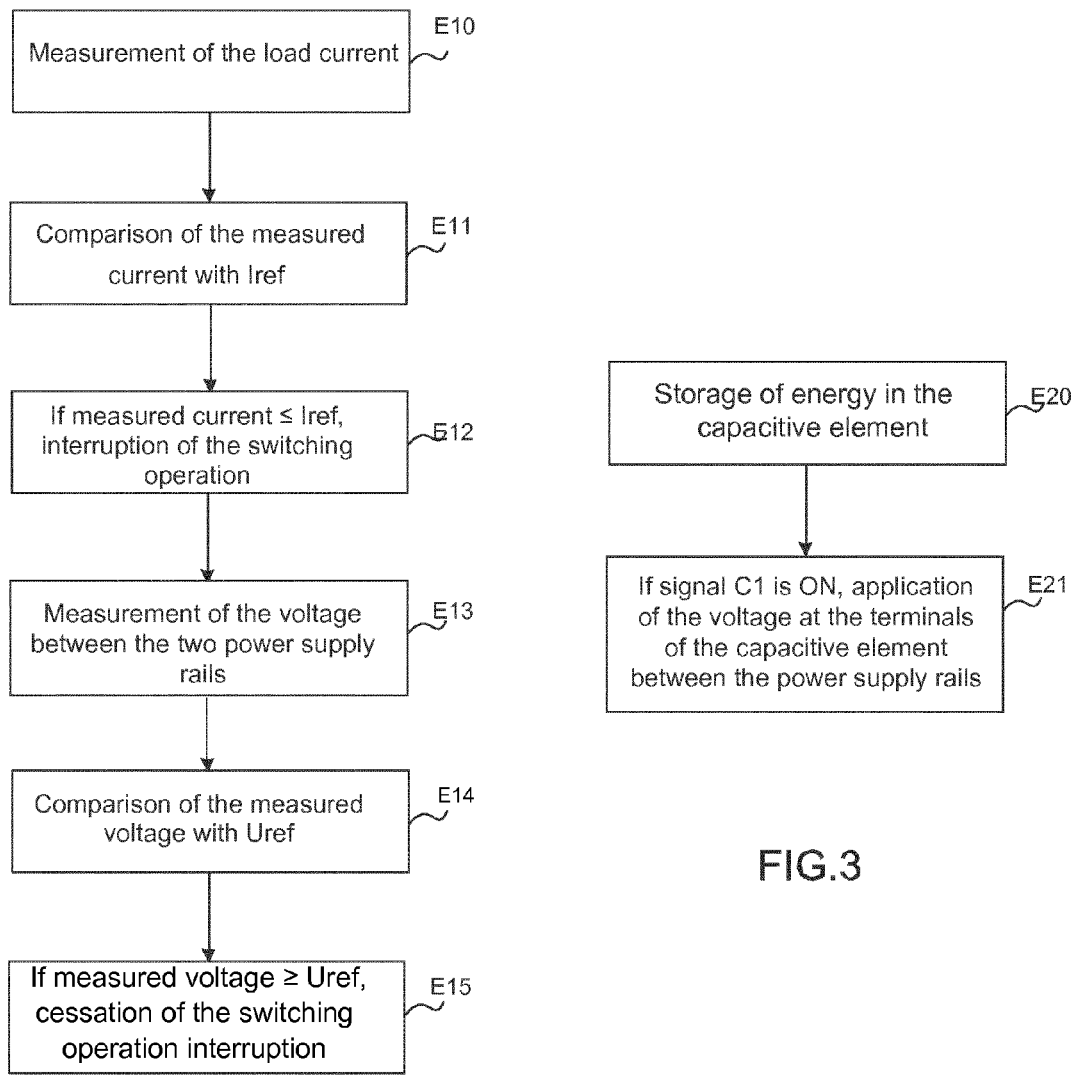
FIG. 2 shows the steps of the method for controlling the switch mode power supply module of FIG. 1.
FIG. 3 shows the steps of the method for controlling the item of equipment of FIG. 1.

The operation of the switch mode power supply module 1 and of the item of equipment 2 is shown by, respectively, FIG. 2 and FIG. 3.

In reference to FIG. 2, the method for controlling the switch mode power supply module 1 comprises the following steps:

E10: measurement of the load current by the measurement circuit 11,
E11: comparison of said measured load current with the predefined load current threshold value Iref,
E12: if the measured load current is less than or equal to Iref, cyclic interruption of the switching operation until the value of the measured load current is greater than Iref,
E13: measurement of the voltage between the two power supply rails,
E14: comparison of the measured voltage with the predefined power supply voltage threshold value Uref,
E15: if the measured voltage is greater than or equal to Uref, cessation of the switching operation interruption.

In reference to FIG. 3, the method for controlling the item of equipment 2 comprises the following steps:

E20: storage of energy from the switch mode power supply module during the switching operation phase of the switch mode power supply module in a capacitive element connected between the two power supply rails,
E21: application between the two power supply rails of the voltage present at the terminals of the capacitive element when the activation signal C1 is in ON state.

These modifications of the power supply module and of the item of equipment make it possible to obtain a device formed of the power supply module and the item of equipment which has a very low residual consumption due to the hiccup mode while retaining a good responsiveness to the commands of the item of equipment.

Though the invention has been described in relation to a specific embodiment, it is evident that this is in no way restricted and that it comprises all technical equivalents of the means described as well as their combinations if these enter into the scope of the invention.

The invention claimed is:

1. Device comprising
an item of equipment;
a switch mode power supply module intended to supply power to said item of equipment and comprising a circuit for measuring a power supply voltage present between power supply rails,
wherein:
said item of equipment comprises a capacitive element connected between power supply rails and an activation circuit,
said capacitive element is suitable for storing energy during a switching operation phase of the switch mode power supply module and for supplying the stored energy to said activation circuit during a switching operation interruption phase of the switch mode power supply module;
said activation circuit is suitable for applying between said power supply rails the voltage present at the terminals of the capacitive element when said item of equipment is started or woken up by an activation signal, and said switch mode power supply module is suitable for ending the switching operation interruption phase as a function of the measured power supply voltage.

2. The device according to claim 1, wherein said switching operation phase has a first duration.

3. The device according to claim 1, wherein said switching operation interruption phase has a second duration.

4. The device according to claim 1, wherein said switch mode power supply module comprises a switching operation control circuit that cyclically interrupts the switching operation, during said switching operation interruption phase, and sustains the switching operation, during said switching operation, as a function of a load current flowing in said item of equipment.

5. The device according to claim 4, wherein said switching operation control circuit interrupts the switching operation when said load current is less than or equal to a load current value.

6. The device according to claim 4, wherein said switching operation control circuit sustains the switching operation when said load current is greater than a load current value.

7. The device according to claim 1, wherein said item of equipment comprises a voltage converter able to convert the voltage at the terminals of said capacitive element into a lower constant voltage supplying power to the activation circuit.

8. The device according to claim 1, wherein said item of equipment further comprises an activation input suitable for receiving said activation signal.

9. The device according to claim 1, wherein said activation signal comes from a timer.

10. Method for controlling a switching operation, to be performed in a device comprising
an item of equipment;
a switch mode power supply module intended to supply power to said item of equipment,
said method comprising a measuring by said switch mode power supply module of a voltage between power supply rails,
wherein said method comprises, in said item of equipment:
storing energy in a capacitive element during a switching operation phase of the switch mode power supply module;
supplying the stored energy during a switching operation interruption phase of the switch mode power supply module;
applying, between said power supply rails, a voltage present at the terminals of said capacitive element when the item of equipment is started or woken up by an activation signal;
and that it comprises a stopping by said switch mode power supply module of the switching operation interruption as a function of the measured voltage.

11. The method according to claim 10, wherein said switching operation phase has a first duration.

12. The method according to claim 10, wherein said switching operation interruption phase has a second duration.

13. The method according to claim 10, wherein said method further comprises, in said switch mode power supply module, cyclically interrupting the switching operation, during said switching operation interruption phase, and sustaining the switching operation, during said switching operation, as a function of a load current flowing in said item of equipment.

14. The method according to claim 13, wherein the switching operation is interrupted when said load current is less than or equal to a load current value.

15. The method according to claim 14, wherein the switching operation is sustained when said load current is greater than the load current value.

16. The method according to claim 10, wherein said method further comprises converting, by said item of equipment, the voltage at the terminals of said capacitive element into a lower constant voltage supplying power to an activation circuit.

17. The method according to claim 10, wherein said method further comprises receiving, by said item of equipment, said activation signal.

18. The method according to claim 10, wherein said activation signal comes from a timer.

19. An item of equipment comprising a capacitive element connected between power supply rails and an activation circuit, said capacitive element being suitable for storing energy during a switching operation phase of a switch mode power supply module intended to supply power to said item of equipment, and for supplying the stored energy to said activation circuit during a switching operation interruption phase of the switch mode power supply module, said activation circuit being suitable for applying between said power supply rails a voltage present at the terminals of the capacitive element when said item of equipment is started or woken up by an activation signal.

20. The item of equipment of claim 19 wherein said switch mode power supply is suitable for ending the switching operation interruption phase as a function of a power supply voltage present between power supply rails.

* * * * *